United States Patent
Pavlovski et al.

(10) Patent No.: US 9,112,910 B2
(45) Date of Patent: Aug. 18, 2015

(54) METHOD AND SYSTEM FOR AUTHENTICATION

(75) Inventors: Christopher J. Pavlovski, Westlake (AU); Laurence J. Plant, North Balwyn (AU)

(73) Assignee: International Business Machines Corporation, Armonk, NY (US)

(*) Notice: Subject to any disclaimer, the term of this patent is extended or adjusted under 35 U.S.C. 154(b) by 1232 days.

(21) Appl. No.: 12/250,615

(22) Filed: Oct. 14, 2008

(65) Prior Publication Data

US 2010/0095360 A1 Apr. 15, 2010

(51) Int. Cl.
| | | |
|---|---|---|
| G06F 7/04 | (2006.01) |
| H04W 4/00 | (2009.01) |
| G06Q 20/00 | (2012.01) |
| H04L 29/06 | (2006.01) |
| G06Q 20/38 | (2012.01) |
| H04W 12/10 | (2009.01) |

(52) U.S. Cl.
CPC ............ *H04L 63/18* (2013.01); *G06Q 20/3821* (2013.01); *H04W 12/10* (2013.01)

(58) Field of Classification Search
CPC ..... H04L 9/3247; H04L 63/102; H04L 63/12; H04L 9/3263; H04L 9/3271; H04L 63/0442; H04L 63/0823; H04L 2209/60; H04W 12/10; H04W 12/02; G06Q 20/3821; G06Q 20/38215
USPC .................. 713/180, 169, 167; 714/36; 726/3
See application file for complete search history.

(56) References Cited

U.S. PATENT DOCUMENTS

| | | | | |
|---|---|---|---|---|
| 3,639,694 | A | * | 2/1972 | Deutsch et al. ................ 370/458 |
| 5,297,206 | A | * | 3/1994 | Orton ............................... 380/30 |
| 5,757,916 | A | * | 5/1998 | MacDoran et al. ............ 380/258 |
| 6,125,457 | A | * | 9/2000 | Crisan et al. ..................... 714/36 |
| 6,215,877 | B1 | * | 4/2001 | Matsumoto .................... 380/277 |
| 6,842,449 | B2 | | 1/2005 | Hardjono |
| 6,950,940 | B2 | * | 9/2005 | Wheeler et al. ............... 713/182 |
| 6,980,660 | B1 | * | 12/2005 | Hind et al. ..................... 380/282 |
| 7,024,556 | B1 | * | 4/2006 | Hadjinikitas et al. ......... 713/168 |
| 7,111,172 | B1 | * | 9/2006 | Duane et al. ................... 713/182 |
| 7,133,939 | B1 | * | 11/2006 | Desai et al. ...................... 710/11 |
| 7,142,783 | B2 | * | 11/2006 | Obeda et al. .................... 398/32 |
| 7,228,566 | B2 | * | 6/2007 | Caceres et al. .................. 726/25 |
| 7,366,892 | B2 | * | 4/2008 | Spaur et al. .................... 713/151 |
| 7,415,043 | B2 | * | 8/2008 | Kaewell et al. ............... 370/479 |
| 7,549,172 | B2 | * | 6/2009 | Tokutani et al. ................ 726/27 |

(Continued)

OTHER PUBLICATIONS

Machrone, Bill, "Secure Instant Messaging," http://www.crime-research.org/analytics/secure-instant-messaging/.

*Primary Examiner* — Arvin Eskandarnia
*Assistant Examiner* — Margishi Desai
(74) *Attorney, Agent, or Firm* — George R. McGuire; Bond Schoeneck & King, PLLC; John Pivnichny

(57) ABSTRACT

A method and system of authenticating communications sessions between two or more parties over one or more simultaneous communications channels using one or more communicating devices is provided including having a first party create a first set of signatures, wherein the first set of signatures includes a signature for each communications channel, communicating with at a second party over at least one communications channel, whereby the second party authenticates the first party's signature associated with the at least one communications channel and accepts communication with the first party.

20 Claims, 3 Drawing Sheets

(56) References Cited

U.S. PATENT DOCUMENTS

| | | | |
|---|---|---|---|
| 7,610,484 B2* | 10/2009 | Kapoor | 713/156 |
| 7,757,293 B2* | 7/2010 | Caceres et al. | 726/25 |
| 7,983,563 B1* | 7/2011 | Uhlhorn et al. | 398/78 |
| 8,121,264 B1* | 2/2012 | Hogg et al. | 379/88.22 |
| 8,443,191 B2* | 5/2013 | Beckwith et al. | 713/167 |
| 2001/0044896 A1* | 11/2001 | Schwartz et al. | 713/169 |
| 2002/0013898 A1* | 1/2002 | Sudia et al. | 713/155 |
| 2002/0048372 A1 | 4/2002 | Toh et al. | |
| 2002/0112162 A1* | 8/2002 | Cocotis et al. | 713/176 |
| 2002/0184504 A1* | 12/2002 | Hughes | 713/177 |
| 2003/0014669 A1* | 1/2003 | Caceres et al. | 713/201 |
| 2003/0023850 A1* | 1/2003 | Brown et al. | 713/176 |
| 2003/0074555 A1* | 4/2003 | Fahn et al. | 713/156 |
| 2003/0093678 A1* | 5/2003 | Bowe et al. | 713/180 |
| 2003/0131235 A1* | 7/2003 | Wheeler et al. | 713/168 |
| 2003/0163551 A1* | 8/2003 | Riordan | 709/219 |
| 2003/0185395 A1* | 10/2003 | Lee et al. | 380/277 |
| 2004/0062548 A1* | 4/2004 | Obeda et al. | 398/25 |
| 2004/0117320 A1* | 6/2004 | Morioka et al. | 705/76 |
| 2004/0143730 A1* | 7/2004 | Wen et al. | 713/150 |
| 2004/0221158 A1 | 11/2004 | Olkin et al. | |
| 2005/0131583 A1* | 6/2005 | Ransom | 700/295 |
| 2005/0144437 A1* | 6/2005 | Ransom et al. | 713/151 |
| 2005/0283608 A1* | 12/2005 | Halcrow et al. | 713/175 |
| 2006/0005033 A1* | 1/2006 | Wood | 713/182 |
| 2006/0147000 A1* | 7/2006 | Novi | 379/88.19 |
| 2006/0155991 A1* | 7/2006 | Kim et al. | 713/168 |
| 2006/0176149 A1* | 8/2006 | Douglas | 340/5.74 |
| 2006/0184961 A1* | 8/2006 | Lee et al. | 725/32 |
| 2006/0195861 A1* | 8/2006 | Lee | 725/19 |
| 2006/0200681 A1* | 9/2006 | Kato et al. | 713/193 |
| 2006/0262929 A1* | 11/2006 | Vatanen et al. | 380/255 |
| 2007/0050624 A1 | 3/2007 | Lord et al. | |
| 2007/0066236 A1* | 3/2007 | Frank | 455/69 |
| 2007/0118891 A1 | 5/2007 | Buer | |
| 2007/0162554 A1 | 7/2007 | Branda et al. | |
| 2007/0168291 A1* | 7/2007 | Landrock | 705/51 |
| 2007/0204347 A1* | 8/2007 | Caceres et al. | 726/25 |
| 2007/0244833 A1* | 10/2007 | Camenisch | 705/71 |
| 2007/0266236 A1* | 11/2007 | Colditz | 713/153 |
| 2007/0271300 A1* | 11/2007 | Ramaswamy | 707/104.1 |
| 2008/0091618 A1* | 4/2008 | Obrea et al. | 705/76 |
| 2008/0132162 A1* | 6/2008 | Witzman | 455/3.06 |
| 2008/0133937 A1* | 6/2008 | Kato et al. | 713/193 |
| 2008/0148374 A1* | 6/2008 | Spaur et al. | 726/6 |
| 2008/0203151 A1* | 8/2008 | Dixon et al. | 235/380 |
| 2008/0222418 A1* | 9/2008 | Futa et al. | 713/176 |
| 2008/0244271 A1* | 10/2008 | Yu | 713/176 |
| 2008/0270789 A1* | 10/2008 | Bandini et al. | 713/176 |
| 2008/0276265 A1* | 11/2008 | Topchy et al. | 725/22 |
| 2008/0318547 A1* | 12/2008 | Ballou et al. | 455/410 |
| 2009/0003597 A1* | 1/2009 | Gantman et al. | 380/44 |
| 2009/0006852 A1* | 1/2009 | Qiu et al. | 713/176 |
| 2009/0210932 A1* | 8/2009 | Balakrishnan et al. | 726/5 |
| 2010/0153982 A1* | 6/2010 | Ramaswamy | 725/9 |
| 2010/0228969 A1* | 9/2010 | Kapoor | 713/156 |
| 2012/0096482 A1* | 4/2012 | Lee | 725/14 |
| 2012/0303962 A1* | 11/2012 | Ghani et al. | 713/176 |

* cited by examiner

METHOD AND SYSTEM FOR AUTHENTICATION

FIELD OF THE INVENTION

The present invention relates generally to methods and systems for data communications, and particularly to authenticating the identity and protecting communications between multiple parties over one or more communications channels.

BACKGROUND OF THE INVENTION

Internet Protocol (IP)-based networks are of great importance in today's information society. A network is comprised of two fundamental parts, the nodes and the links. A node is a type of network device, such as a computer. Nodes are able to communicate with other nodes through links, like cables or radio wave transmission. There are basically two different network techniques for establishing communication between nodes on a network: the circuit-switched network and the packet-switched network techniques. The former is the traditional telephone system, while the latter is used in IP-based networks.

A circuit-switched network creates a closed circuit between two nodes in the network to establish a connection. The established connection is thus dedicated to the communication between the two nodes. One of the immediate problems with dedicated circuits is wasted capacity, since almost no transmission uses the circuit one hundred percent of the time. Also, if a circuit fails in the middle of a transmission, the entire connection must be dropped and a new one established.

IP-based networks on the other hand utilize a packet-switched network technology, which uses available capacity much more efficiently and minimizes the risk of possible problems, such as a disconnection. Messages sent over a packet-switched network are first divided into packets containing the destination address. Then, each packet is sent over the network with every intermediate node and router in the network determining where the packet goes next. A packet does not need to be routed over the same links as previous related packets. Thus, packets sent between two network devices can be transmitted over different routes in the event of a link breakdown or node malfunction.

Examples of IP-based communications include instant messaging (IM) and Voice-over-Internet Protocol (VoIP). These forms of communications make it easier for businesses and the general public to quickly and conveniently reach out and contact each other. In traditional analogue voice communication, the voice is carried between parties in a circuit switch connection in the closed telecommunications service provider's networks and identity of a calling entity is determined by recognition of the voice and in some instances by Calling Line Identification, which is a function of the underlying telecommunications network, and in some cases, through the caller entering user identification and password, such as when accessing phone banking services provided by interactive voice response (IVR).

Newer forms of IP based communication support the establishment of multiple modes of communication simultaneously. Such systems are typically referred to as multimodal systems, where two parties communicate with each other over two or more modes of communications such as text, video, and voice. For example, a user may establish a voice call from a cell phone with a merchant to order a product or service. In such an interaction, the merchant may elect to simultaneously respond with both a text menu of available products and a voice response. The user may continue to interact with the merchant via voice or text selection, or both and further parties may join the communications session. Such systems are particularly prone to new forms of attack where authentication of the both parties is required as additional modes of communication are added or removed from the interactions between multiple parties.

Since these traditional voice-based communications sessions relied upon closed networks and analogue techniques, the threat of call interception and speech manipulation was very low. However, with newer emerging digitally based communication schemes such as VoIP, the voice is carried on an open shared network in packets and call interception and speech manipulation is easier, with no guarantee that of authenticity of the calling party. This same problem arises with video telephony systems using newer digitally based schemes. Furthermore, the packet data network equivalent to Calling Line Identification cannot be assured given the possibility of e data packets being intercepted and manipulated. Increasingly, communication is occurring over open networks, such as the Internet, which are more susceptible to security attacks and digital tampering. Furthermore, communications rely on different forms of identity and authentication across different communications subsystems and technologies.

For example, many security challenges arise when the party initiating the communication, e.g., Party A, is not well known to the party receiving the communication, e.g., Party B. That is, if a credit card company wants to speak with a customer, the customer receiving the call may not know that it is really their credit card company calling them or a party impersonating their credit cart company. Party B either trusts Party A and accepts risk by continuing the call, or disconnects the call and, if motivated to do so, contacts the original Party A by phoning them (phoning the credit card company in this example).

Another example of a security threat is when Party A is well known to Party B. While Party A and Party B may recognize each other's voices, with modem IP-based communications and speech synthesis technology, it is increasingly possible for an external party to intercept a phone call and impersonate or masquerade as the intended recipient (B Party). This can be performed by intercepting and manipulating the packets to digitally alter the voice signal. In this case, Party A does not really know if he is speaking with Party B. In yet another example, an external party may impersonate Party A and initiate contact with others who accept the call and may fail to recognize the fraud.

Security challenges also arise when customers contact organizations such as bank call centers. Call centers typically ask callers to verbally provide personal information such as address and date of birth as part of the process of authenticating the caller as a customer. Clearly, divulging personal data routinely to multiple people in multiple cities and countries over the course of time dilutes the value of the personal data as a secure credential for authentication. Date of birth cannot be a secure form of identification when it is given out to multiple people and organizations on hundreds of occasions over a period of time.

Speech based threats above also apply to video based communication systems, where an attacker may alter the signal to impersonate another entity. Additionally, threats arise when the communication is not session-based. In an example of an asynchronous communication over email, phishing is a security issue where the Party B receives an email purporting to be, for example, a bank of which they are a customer, and the email encourages the recipient to take action in order for the recipient to unwittingly divulge personal information to an unknown external party.

A further threat occurs due to the multiplicity of digital communications channels available (e.g., messaging, video, voice) wherein the calling party may commence dialogue in one communications channel and transfer to another. Furthermore, one or more of the parties may roam from one wireless or fixed access network to another or one or more of the parties can switch from one device to another. The additional security problem in these situations is not knowing that an authentic transfer has been achieved and not knowing if no session "hi-jacking" has been performed by an attacker.

Another example of a threat occurs after the communication channel has been established and parties have been successfully authenticated. If an attacker intercepts and redirects the packet data forming the communications channel, the attacker can "hi-jack" the call, removing one party from the communications session and impersonating the removed party. Without ongoing authentication, the other parties in the call may not realize they are interacting with a person different to the one with which they started the voice call or Instant Messaging chat session.

A further example is where communications occur between two parties over multiple channels simultaneously such as multimodal dialogue systems. For instance, a voice call may be established between two parties as one mode of communication with subsequent modes of communication, such as text or video, established simultaneously between the two parties. These multiple modes of communication may be established over a single communications channel or multiple communication channels and access networks or with multiple devices. The problem arises to correctly authenticate the identity of the party for the initial communication channel and all subsequent sessions established over the communications channels. Furthermore, it is possible for an attacker to attempt to masquerade as one of the parties in an attempt to establish an additional mode of communication. This may be an attempt to eavesdrop or carry out some other attack. Another example is a caller using self care services on an IVR or automated chat server and subsequently invoking assisted care to have a human agent guide the caller through the self care interface. Still, a further example is one party arriving home and electing to switch the session from the mobile device to the home fixed internet device.

It is a primary object of an embodiment of the invention to provide a method and system that provides a way for parties communicating with one another over multiple channels that are established either simultaneously or sequentially, to verify that each party is actually communicating with the correct person. It is another object of an embodiment of the invention to provide a method and system that provides security of communications between employees, customers, suppliers and related entities over established communications channels. It is a further object of an embodiment of the invention to provide a method and system that provides secure communications sessions for service providers such as telephone companies, internet service providers and general users of these systems. It is yet a further object of an embodiment of the invention to provide a method and system that provides secure communications sessions for firms specializing in securing electronic transactions. It is still another object of an embodiment of the invention to provide a method and system that provides secure communications for network equipment providers who offer collaboration products to enterprise and telephone company service providers. It is still another object of an embodiment of the invention to provide a method and system that provides secure communications for users roaming across networks or switching devices. It is still another object of an embodiment of the invention to provide a method and system that provides secure communications between systems provided by different service providers, such as between IM sessions spanning multiple IM providers such as Facebook, Second Life, Google Talk and corporate IM. A further object of an embodiment of the invention is to provide a method and system that provides authentication and secure communications for multimodal dialogue systems. Another object of an embodiment of the invention is to provide a method and system that provides authentication and secure communications between two or more parties over multiple communications channels, which may vary in multiplicity between each and every communicating party.

SUMMARY

According to one embodiment of the present invention, a method of authenticating a communications session between two or more parties over one or more simultaneous or sequential communications channels is provided including having a first party create a first set of signatures, wherein the first set of signatures includes a signature for each communications channel, communicating with at a second party over at least one communications channel, whereby the second party authenticates the first party's signature associated with the at least one communications channel and accepts communication with the first party.

In a further aspect of the method, each of the first set of signatures includes a different signature for each communications channel and a different signature for each party involved in the communication. Each party uses a communicating device, wherein the first set of signatures includes a different signature for each communicating device.

In another aspect of the method, each signature includes a channel identifier.

In yet a further aspect of the method, the second party creates a second set of signatures, wherein the second set of signatures comprises a different signature for each communication channel, and wherein the first party authenticates the second party's signature associated with the respective communication channel.

In still another aspect, the method provides including an M amount of parties communicating over an N amount of channels, whereby each party provides a number of signatures equal to M×N, where M equals the number of parties communicating and N equals the number of communication channels being used.

In a further aspect of the method, a party's signature must be authenticated by each party with whom it will communicate before a communication can occur.

In one more aspect of the method, the communication channels include multiple forms of interaction, but are not limited to, instant messaging, voice-over-internet protocol, email, video conferencing, haptics, and/or short message service.

In still another aspect of the method, the set of signatures is created prior to or during the communications session.

In a further aspect of the method, authenticating includes checking credentials, the credentials including, but not limited to, a user identification, a password, biometric information, and/or a certificate.

According to another embodiment of the present invention, a system for authenticating a communications session between two or more parties over one or more communication channels is provided including two or more communication devices, one or more communications channel linked to the two or more communications devices; an authentication module linked to the two or more communications devices; a certificate authority server; two or more user interfaces linked to the two or more communications devices, wherein a first set of signatures is created at one user interface for each communications channel and sent to each communicating party (who may, upon receipt of these signatures, contact a certificate authority server), and wherein each signature corresponding to the respective communication channel is verified by the authentication module before a communication can be received.

In a further aspect, the system includes N amount of communications channels for an M amount of communicating parties, wherein each party provides a set of total signatures equal to M×N, where M equals the number of communicating parties and N equals the number of communications channels used.

In yet another aspect of the system, one or more communications channels may be established simultaneously or sequentially for communication thereover. Each signature in the set of total signatures includes a different signature for each communications channel. A signature must be verified before a communication session can begin on a communications channel.

In still a further aspect of the system, the communications channels includes instant messaging, voice-over-internet protocol, email, video conferencing, short message service, and/or haptics. The communications devices include a PSTN phone, a cellular phone, a personal digital assistant, a portable media player, and/or a computer. In a further aspect, the system includes a plurality of communication devices for receiving communication from one communication device, wherein the one communication device broadcasts to the plurality of communication devices in a unilateral communication stream.

In yet another embodiment, a computer program product encoded in a computer readable medium for instructing a system to authenticate a communications session between two or more parties over one or more communications channels is provided including instructing the creation of a set of signatures, wherein the set of signatures includes a signature for each communications channel, instructing the set of signatures to be sent to each communicating party (who may, upon receipt of these signatures, contact a certificate authority server), and instructing an authentication module to authenticate each signature for each communications channel.

In a further aspect, the computer program product instructs the creation of M×N signatures for each communicating party, wherein M equals the number of communicating parties and N equals the number of communications channels used. Each signature of the set of M×N signatures includes a different signature for each communications channel.

In yet another aspect, the computer program product instructs the establishment of the one or more communications channels simultaneously or sequentially for communication thereover.

In a further aspect, the computer program product instructs the verification of a signature before a communication session can begin on a communications channel.

DETAILED DESCRIPTION

Embodiments of the invention provide a system and method for authenticating multiple entities communicating via multiple simultaneous or sequentially established communication channels involving the use of a digital signature protocol to authenticate each entity.

Figure 1:
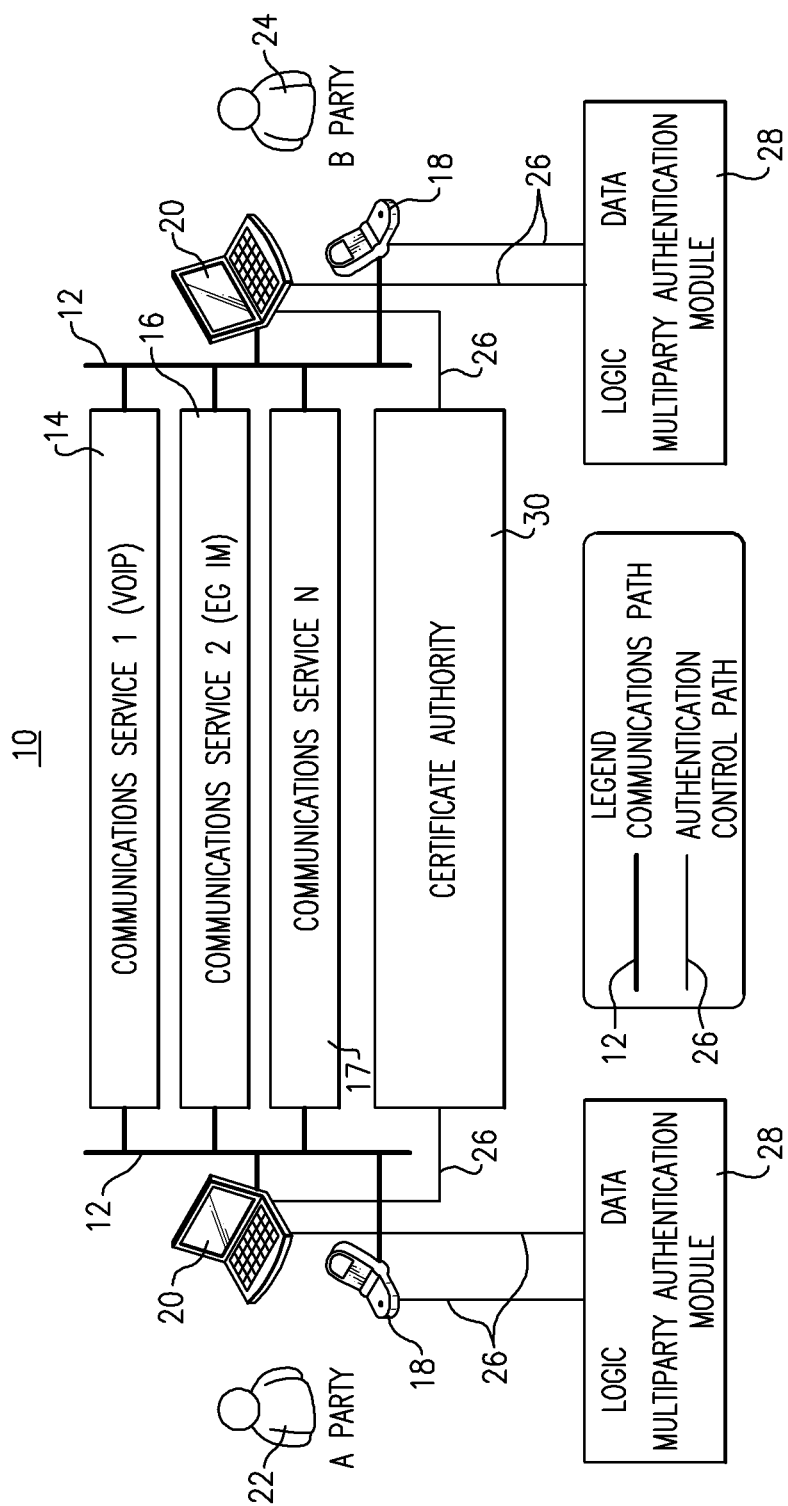
FIG. 1 shows a schematic diagram of an embodiment of a system of the invention.

Reference is made to FIG. 1, which shows an embodiment of a system 10 used for preventing security breaches in communications between two or more parties. One or more simultaneous communications paths 12 are shown by the thick, heavy line. Communication path 12 may follow a variety of paths depending on the form of communication. An example of one communication service or channel is voice over internet protocol (VoIP), as shown in Communications Service 1 as depicted by 14. Another example is instant messaging (IM), as shown in Communications Service 2 as depicted by 16. Additional communication channels, which may be established sequentially or simultaneously, may be provided and represented in FIG. 1 by Communication Service N at 17. Examples of additional communication channels include, but are not limited to, email, short message service (SMS), and video conferencing.

In order to use system 10, a caller 22 represented by Party A initiates a communication session by placing a request for communication to a caller 24 represented by Party B. The communication device may be any device, such as a telephone 18 (A & B) or a computer 20 (A & B), which can communicate over IP or other internet working protocols. For instance, Party A uses telephone 18A and communication service 14 (VoIP) to contact Party B's telephone 18B. Party B responds by requesting the credentials of Party A. The authentication control path 26 is represented by the thin line. The communication by Party A to Party B is authenticated by the authentication module 28, which includes logic and data that is deployed locally upon the device (i.e., mobile phone, laptop, or other communicating device). Party A may also request authentication of Party B's credentials. When more than two parties are involved in the communication session, either only the calling party (Party A) is authenticated, or each party, both the calling party and the called party, is authenticated. When one or either party requests to initiate a change in the type of communication channel, the original signature may be used to verify that the correct channel has been selected and is also associated with the respective party. A change in the communication channel can also introduce a change of devices used by the parties.

The certificate authority 30 is used if a party, (e.g., Party B) does not have access to the public key to verify the signatures during the batch verification steps. In practice, the public key may already be stored locally on each device. If the public key is not stored, the device may interrogate a certificate authority to retrieve this information.

Figure 2:
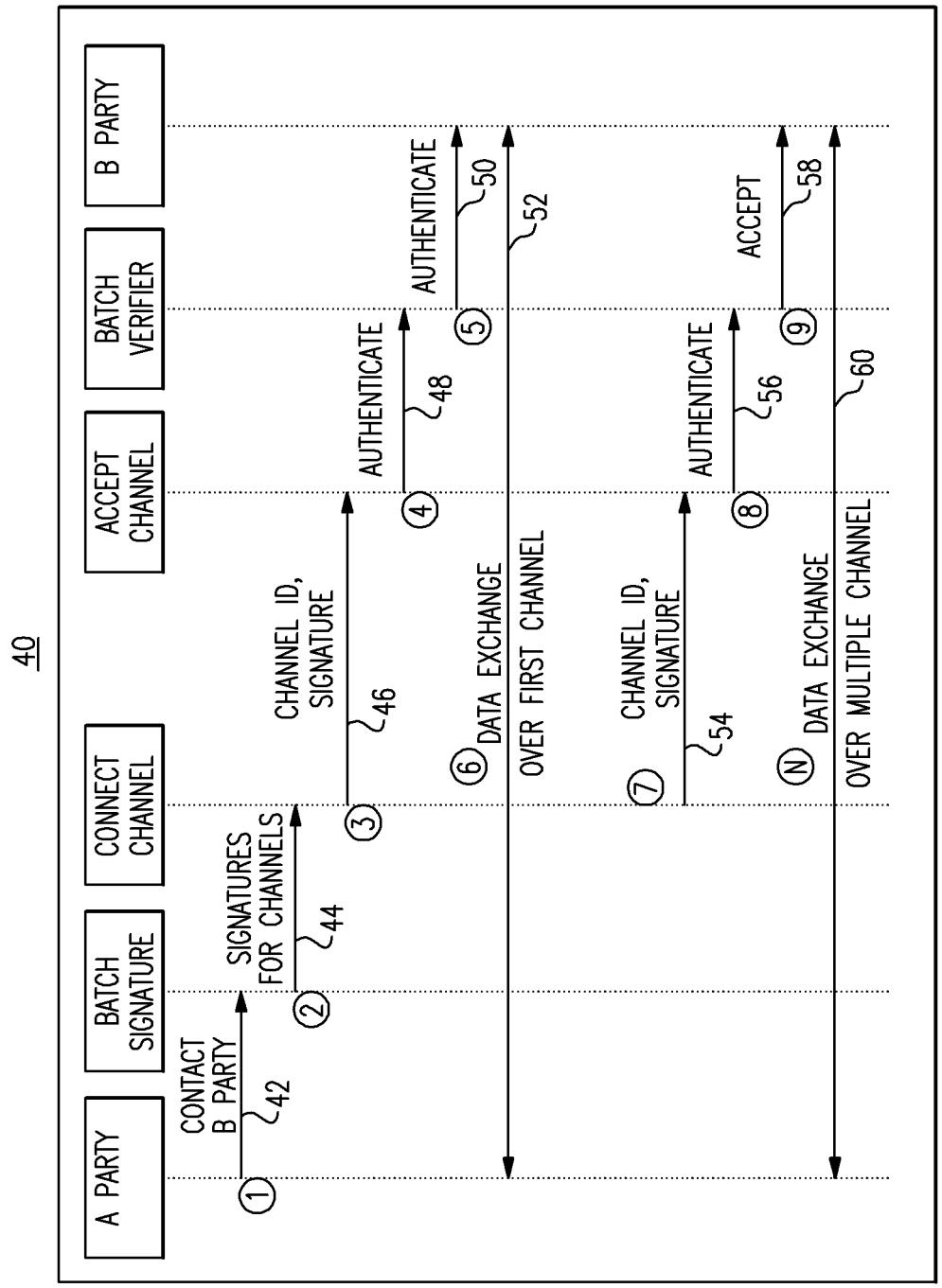
FIG. 2 shows a schematic diagram of an embodiment of a method of the invention.

Reference is made to FIG. 2, which illustrates the protocol 40 for one entity wishing to communicate with another entity over one or more communication channels. In the first step, Party A decides to contact Party B at 42. Next, at 44, Party A prepares a set of signatures for all channels available for communication. Although it is possible that only one channel of communication may be used, a signature for each possible channel is created at this step. At the next step, 46, the actual connection request is made to Party B, with the signature for Party A forwarded for authentication. At step 48, the incoming connection with Party A's signature is forwarded to a signature verification module of Party B, which may be a batch verifier where a batch signature is applied. The batch verifier uses the public verification key of Party A to verify the signature and confirm the identity of Party A. If Party B does not have the public verification key of Party A, then this is retrieved from the certificate authority server. Other types of verification data that may be used include, but are not limited to, user ids, passwords, biometric information (e.g., voice profile), and certificates. If the verification succeeds, Party B accepts the call at step 50. In the case of mutual authentication, Party B would also respond at this point with a signature for Party A to verify. Party A would verify the Party B signature in the same way Party B verifies the Party A signature outlined above. The communication session is now established and data exchange occurs over the selected communications channel between authenticated identities, at step 52. The data is the content of the communications, being, for example, VoIP or IM messages exchanged between the parties.

When additional channels of communication are required between Party A and Party B, steps 54, 56 and 58 will occur for each additional channel. For example, after connection via an on-line chat, the two parties may wish to communicate over a voice channel, or a video channel. This step 54 is fundamentally the same as step 46 except that a signature that has been precomputed from step 44, specifically for the new channel to be used, and is forwarded to Party B. The incoming new connection request from Party A's signature is forwarded to the batch verifier at step 56. The batch verifier uses the public verification key of Party A to verify the signature and confirm the identity of Party A. If the verification succeeds, Party B accepts the call at step 58. Step 60 involves communication over two or more communication channels either simultaneously or sequentially between authenticated parties.

The security of the protocol is dependant on the underlying signature protocols in use. Once a secure and authenticated communications channel has been established, additional key management tasks such as key exchange may be performed securely.

Figure 3:
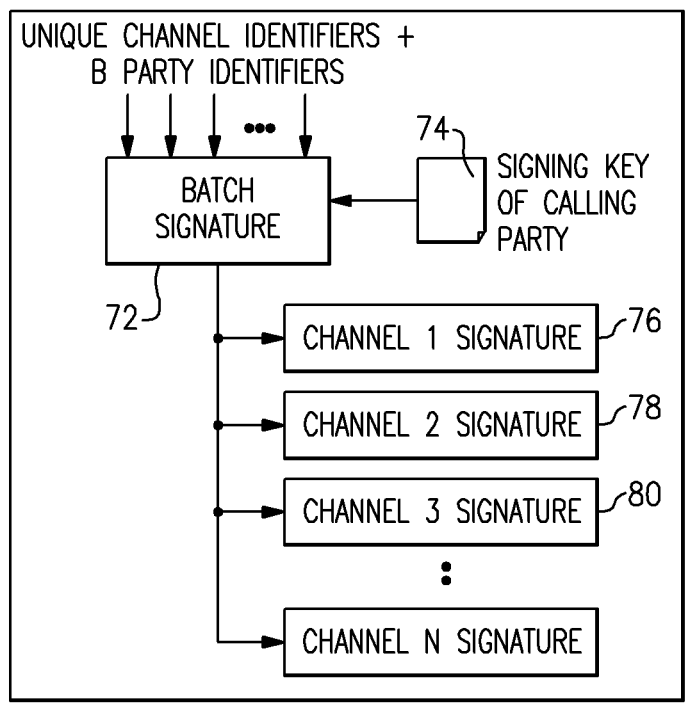
FIG. 3 is a schematic diagram of a batch signature protocol of an embodiment of the present invention.

Reference is made to FIG. 3, which shows a batch signing process 70. A batch signature 72 is used to authenticate the identity of a party and to authenticate the channel being used for communication. Batch signature 72 is basically built upon a normal signature protocol such as (for example) RSA, which uses both public and private keys. This process is not limited to the RSA protocol and any batch signature protocol may be used. One function of batch signature 72 is that several messages can be signed at once during the signing step. Accordingly, instead of performing a signature operation for every communication, only one signature operation channel is performed. The batch signature is a more efficient means of creating a signature, since only one signature operation is performed. This is a major advantage over the option of performing a signature operation for every channel, which is very inefficient.

Process 70 requires a unique channel identifier to be selected, that is only known to the signer, before the batch signature process, together with the identifier of Party B. The identifier is only disclosed when another channel is required for communication, to prevent an attacker from using the valid signature on the channel. As such, an additional or alternative channel is required for communication, the signature for which is forwarded to Party B for authentication. In addition to a unique channel identifier, and the identity of the calling party, batch signature 72 also includes a signing key 74 of the signer or calling party. Depending upon the number of communication channels involved and the number of parties communicating, the number of signatures to be provided at the beginning of the signing process will be determined.

The protocol shown in FIG. 3 illustrates the steps to be taken between two authenticating parties. In this scenario Party A is in communication with only one user. With only one user and three channels, Party A will provide a signature for each channel, for a total of three signatures, 76, 78, 80. The protocol may be extended in a straightforward manner in several scenarios. An example of another scenario is the One-to-Many scenario. In this example one user, e.g., Party A, is in communication with multiple users over multiple channels. Party A must pre-compute a signature for each user (M) for each channel (N). N×M signatures will be pre-computed, similar to the illustration in FIG. 3: (3 channels)×(3 users)=9 signatures to be pre-computed by Party A.

An example of another scenario is a Many-to-Many scenario. In this example, many parties are communicating with each other. Each participating party (defined by $M_u$) constructs a set of signatures ($M_s$), for each channel N, so that each party can communicate with all the participating parties. This means that $N \times M_u \times M_s$ signatures will be precomputed. For example, if there are 3 channels and 4 users, 4 signatures are required at each channel from each user. Accordingly, for each user for each channel, there will need to be a total of 3×4×4=48 signatures precomputed. Each party will have to provide a total of 12 signatures. It should be mentioned that due to the multiplicity of channels, either the same device or different devices may be used by the parties participating in the communication.

A further scenario occurs when the initiating party, Party A, uses multiple devices over multiple channels. In this scenario, each additional device of Party A is treated as a called party device and is sent a pre-computed signature so that the device may be used in the communications dialogue with other parties.

Figure 4:
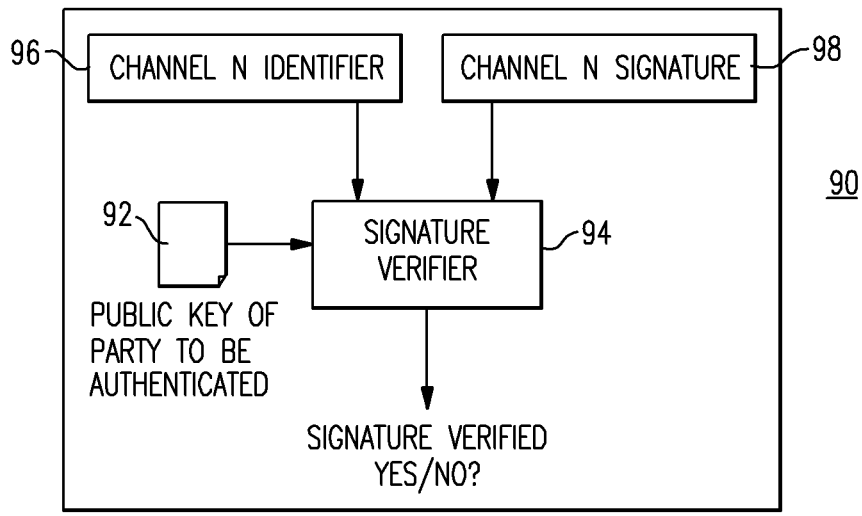
FIG. 4 is a schematic diagram of a verification protocol of an embodiment of the present invention.

FIG. 4 illustrates the verification process 90 used in an embodiment of a method and system herein. In order to verify a signature of a user, a public key 92 of the party to be authenticated must be provided to the signature verifier 94. This may be provided by the initiating party or retrieved by Party B from a remote certification authority. The channel identifier 96 and the channel signature 98 are also provided to the signature verifier 94 to authenticate the calling party.

Embodiments of the system and method herein provide authentication of users of communications services. They enable all parties in one or more simultaneous or sequential communications sessions to (a) be authenticated; (b) have visibility of correct authentication of other parties in the session; (c) have the credentials for each party to be private and shared only with the authentication system and not with the other parties in the session; (d) use different means for authentication and for different parties to be authenticated on different authentication systems; (e) have ongoing re-authentication during the call to enable participants to recognize if the session is high-jacked or joined by an impersonator or unknown party; (f) have protection of communications sessions over open networks form session tampering; and (g) have protection as users roam across networks or switch devices.

Use of embodiments of the authentication method and system herein enables each party in a user to user communication session to be confident they are dealing with the other party and not someone impersonating the other party. Authenticated parties can communicate over one or more simultaneous or sequential communications channels or with one or more devices. Once authenticated, changing channels does not require a new authentication of identities, since authentication information is provided during the initial authentication phase. Therefore, only periodic verification of original credentials is required. Moreover, authentication is efficient, requiring only a single authentication protocol sequence for multiple channels.

It is very beneficial in the broadcast scenario. It signs both text and resultant speech in translation engines in a single protocol execution. These may be distributed to multiple languages in a broadcast scenario. The one-to-many (one signature only) and many-to-many (N signatures required) authentication mechanism is very efficient. Hijacking of communications sessions is prevented since the signatures are all precomputed prior to the establishment of any of the connections. It provides a feature for any party in the communication session to request all others to be re-authenticated, or for automatic requests for re-authentication to be reissued on a periodic or other event basis. This addresses the situation where one party has walked away from the call and left the line open and another party has started using the same device. For example, if the original party has walked away from an IM session in an internet café and another party has started to use the computer and participates in the IN session.

The computer-readable program code may include various components, such as program code, code to display a user interface, code to instruct the creation of a set of signatures, wherein the first set of signatures comprises a signature for each communications channel, code to instruct sending the set of signatures to a certificate authority server; code to instruct an authentication server to authenticate each signature for each communications channel.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method of authenticating a communications session between two or more user communications devices over a plurality of communications channels comprising:
   creating a first set of signatures by the first user communications device, wherein the first set of signatures comprises a unique signature for each of a plurality of communications channels;
   communicating one of said first set of signatures to a second user communications device comprising a first authentication module over one of said plurality of communications channels, wherein the first authentication module of said second user communications device retrieves a verification key from local storage and authenticates the first user communications device's signature associated with the one of said plurality of communications channels using the retrieved verification key;
   accepting communication with the first user communications device only if the first user communications device's signature is successfully authenticated by said first authentication module;
   communicating, only if a second of the plurality of communications channels are required, a second of said first set of signatures to the second user communications device over a second of said plurality of communications channels, wherein the first authentication module of said second user communications device retrieves a verification key from local storage and authenticates the first user communications device's second signature using the retrieved verification key; and
   accepting communication with the first user communications device over the second communications channel only if the second signature is successfully authenticated by said first authentication module.

2. The method of claim 1 wherein the one or more communications channels may be established simultaneously or sequentially for communication thereover.

3. The method of claim 1 wherein each signature comprises a channel identifier.

4. The method of claim 1 wherein at least a second user communications device creates a second set of signatures, wherein the second set of signatures comprises a different signature for each of a plurality of communication channels, and wherein the first user communications device authenticates the second user communications device's signature associated with the at least one said plurality of communication channels.

5. The method of claim 1 comprising an M amount of user communications devices communicating over an N amount of channels, whereby each user communications device provides a number of signatures equal to M×N, where M equals the number of user communications devices communicating and N equals the number of communication channels being used.

6. The method of claim 5 wherein a user communications device's signature must be authenticated by each user communications device with whom it will communicate before a communication can occur.

7. The method of claim 6 wherein the authenticating process comprises checking credentials, the credentials comprising a user identification, a password, biometric information, and/or a certificate.

8. The method of claim 1 wherein the plurality of communication channels comprise multiple forms of interaction.

9. The method of claim 8 wherein the multiple forms of interaction comprise instant messaging, voice-over-internet protocol, email, video conferencing, short message service, and/or haptics.

10. The method of claim 1 wherein the set of signatures is created prior to or during the communications session.

11. A system for authenticating a communications session between two or more communicating parties over a plurality of communication channels, the system comprising:
    a first user communications device, the first user communications device configured to create a first set of signatures comprising a unique signature for each of a plurality of communications channels;
    a second user communications device, said first user communications device comprising a first authentication module; and
    a plurality of communications channel linked to the first and second communications devices;
    wherein the first user communications device is configured to communicate one of said first set of signatures to the second user communications device over one of said plurality of communications channels;
    wherein the second user communications device is further configured to:
      retrieve a verification key from local storage in response to receiving a set of signatures;
      authenticate the first user communications device's signature associated with the one of said plurality of communications channels using the retrieved verification key;

accept communication with the first user communications device only if the first user communications device's signature is successfully authenticated by said first authentication module;

receive, only if a second of the plurality of communications channels are required, a second of said first set of signatures from the first user communications device over a second of said plurality of communications channels;

retrieve a verification key from local storage and authenticates the first user communications device's second signature using the retrieved verification key; and accept communication with the first user communications device over the second communications channel only if the second signature is successfully authenticated by said first authentication module.

12. The system of claim 11 further comprising N amount of communications channels for an M amount of communicating parties, wherein each user communications device provides a set of total signatures equal to M×N, where M equals the number of communicating user communications devices and N equals the number of communications channels used.

13. The system of claim 11 wherein one or more communications channels may be established simultaneously or sequentially for communication thereover.

14. The system of claim 11 wherein the plurality of communications channels comprise instant messaging, voice-over-internet protocol, email, video conferencing, short message service, and/or haptics.

15. The system of claim 11 wherein the two or more user communications devices comprise a PSTN phone, a cellular phone, a personal digital assistant, a portable media player, and/or a computer.

16. The system of claim 11 comprising a plurality of user communication devices for receiving communication from one user communication device, wherein the one user communication device broadcasts to the plurality of user communication devices in a unilateral communication stream.

17. A computer program product encoded in a computer readable storage device for instructing a system to authenticate a communications session between two or more user communications devices over a plurality of communications channels, the computer program product configured to instruct a system to perform the steps of:

instructing the first user communications device to create a first set of signatures, wherein the first set of signatures comprises a unique signature for each of a plurality of communications channels;

instructing the communication of at least one of said first set of signatures over one of said plurality of communications channels to a second user communications device, said second user communications device comprising a first authentication component;

instructing said first authentication component to retrieve a verification key from local storage and authenticate the first user communications device's signature associated with the one of said plurality of communications channels using the retrieved verification key;

instructing said second user communications device to accept communication with said first user communications device only if the first user communications device's signature is successfully authenticated by said first authentication module;

instructing said first user communications device to communicate, only if a second of the plurality of communications channels are required, a second of said first set of signatures to the second user communications device over a second of said plurality of communications channels;

instructing said first authentication component to retrieve a verification key from local storage and authenticate the first user communication device's second signature using the retrieved verification key; and instructing said second user communications device to accept communication with said first user communications device over said second communications channel only if said second signature is successfully authenticated by said first authentication module.

18. The computer program product of claim 17 further comprising instructing the creation of M×N signatures for each communicating user communications device, wherein M equals the number of communicating user communications devices and N equals the number of communications channels used.

19. The computer program product of claim 18 wherein each signature of the M×N signatures comprises a different signature for each communications channel.

20. The computer program product of claim 17 further comprising instructing the establishment of the plurality of communications channels simultaneously or sequentially for communication thereover.

* * * * *